United States Patent [19]

Wick

[11]  4,225,306

[45]  Sep. 30, 1980

[54] METHOD OF CONTROLLING A HEATING FURNACE FOR STEEL INGOTS

[75] Inventor: Hans-Joachim Wick, Dortmund, Fed. Rep. of Germany

[73] Assignee: Hoesch Werke Aktiengesellschaft, Dortmund, Fed. Rep. of Germany

[21] Appl. No.: 13,662

[22] Filed: Feb. 21, 1979

[30] Foreign Application Priority Data

Jan. 3, 1978 [DE] Fed. Rep. of Germany ....... 2808771

[51] Int. Cl.³ .......................... F27D 7/00; F27B 1/26
[52] U.S. Cl. ...................................... 432/24; 432/36; 432/52
[58] Field of Search ...................... 432/24, 36, 37, 43, 432/51, 52

[56] References Cited

U.S. PATENT DOCUMENTS 2,776,827  1/1957  Graham ................................. 432/43

FOREIGN PATENT DOCUMENTS 45-6410  4/1970  Japan ......................................... 432/43

Primary Examiner—John J. Camby

Attorney, Agent, or Firm—Max Fogiel

[57]  ABSTRACT

A method of controlling a heating furnace for steel ingots, particularly a soaking pit for steel ingots, which is charged with a basic fuel quantity for heating the ingots to rolling temperature. The surface temperature of the ingots and thermal data of the furnace are measured and heat balances are established. From the resulting furnace balance temperatures, together with the surface temperature of the ingots, an estimated value for the center temperature of the ingots is determined in an estimating device. The estimated ingot center temperature and the ingot surface temperature as actual temperatures are compared with predetermined ingot core and surface temperatures as nominal temperatures. The resulting difference is used to correct the basic fuel quantity fed to the furnace. The surface temperature of each individual ingot in a furnace may be measured. The correction of the basic fuel quantity may be started after an empirically determined time interval of ingot heating in the furnace, and may be ¼ to ⅓ of the total required pit time, which is the time between charging and drawing of ingots from the pit. During the pit time, ingots are heated in the soaking pit.

4 Claims, 2 Drawing Figures

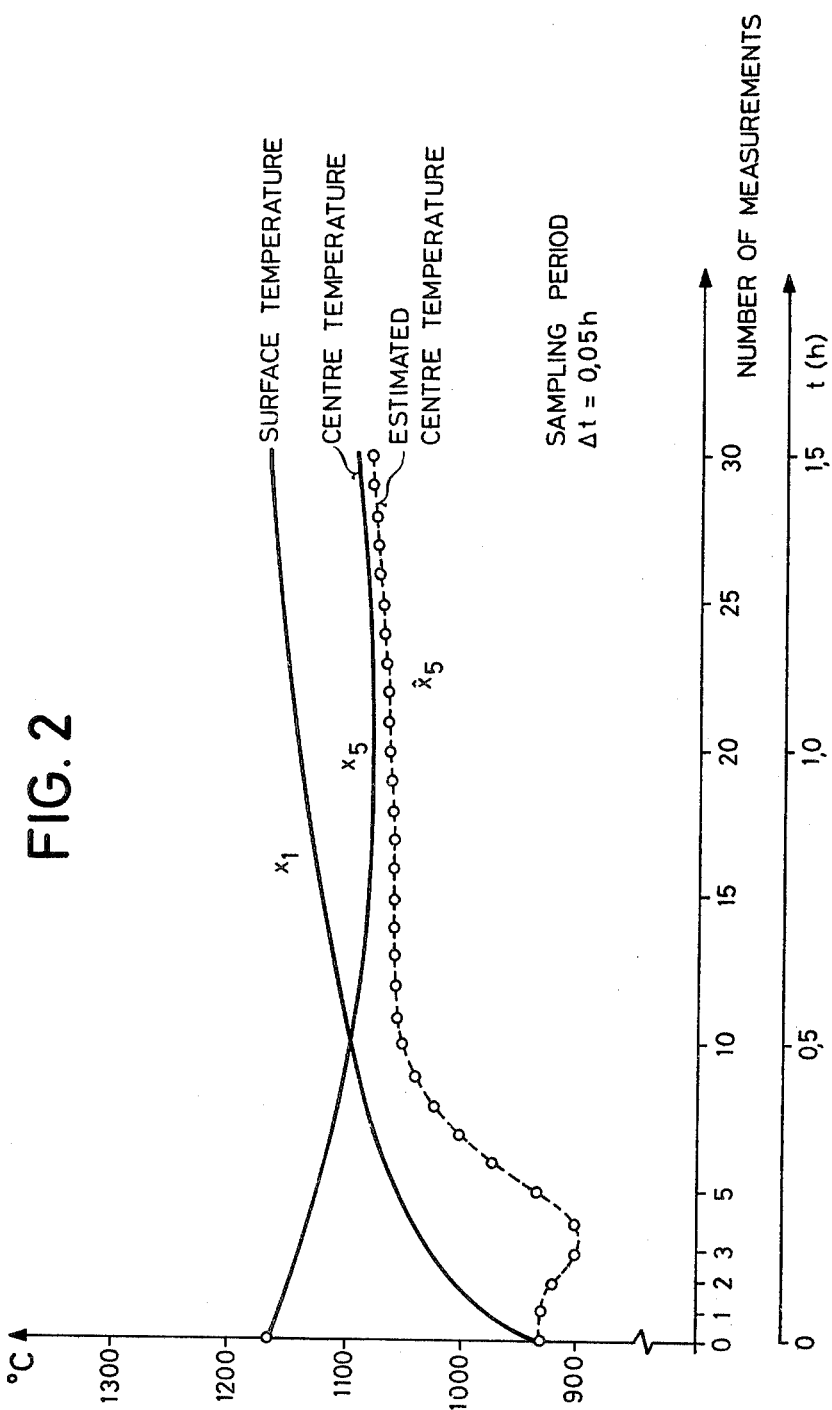

METHOD OF CONTROLLING A HEATING FURNACE FOR STEEL INGOTS

BACKGROUND OF THE INVENTION

The present invention relates to a method for controlling a heating furnace for steel ingots, particularly soaking pit for steel ingots which is charged with a basic fuel quantity for heating the ingots to rolling temperature.

In the soaking pit, the ingots supplied by the steel mill are heated to a rolling temperature as uniform as possible. These ingots had previously undergone a solidification and cooling process where the poured ingots first are cooled in the mold and are stripped in the partially solidified state. Afterwards the stripped ingots are cooled in air and are delivered to the heating furnace into which they are charged. The temperature profile over the cross-section of the ingot at the time of charging in the furnace has a considerable temperature gradient. The center is hottest at 1400° to 1520° C. and sometimes still liquid; the temperature drops to 800°–1000° C. on the ingot surface. This extreme temperature gradient is removed in the soaking pit; the heating time in the furnace is chosen so that at the end of the heating period the ingot has a fairly uniform temperature over the entire cross-section. The temperature level of 1150°–1300° C. depends on the rolling conditions.

The soaking pit is heated by oil or gas. Ordinarily it is constructed so that it can accommodate a number of vertically standing ingots. According to the present state of the art, the furnace is controlled by providing a set point for the furnace temperature. The burners receive a maximum fuel quantity which does not change until the furnace temperature reaches the set point. Upon reaching the set point temperature, the fuel quantity is slowly reduced by the temperature controller and the furnace temperature is held constant. The ingots remain in the furnace at this constant temperature until the operator determines whether ingots in the pit are ready for drawing on the basis of past experience.

This type of control up to draw readiness depends on the heating condition of the furnace and only indirectly on that of the ingots. Therefore, the final roll temperature must be used for correcting the furnace operation, to avoid roll temperatures which are too low or too high.

Accordingly, it is an object of the present invention to provide a method for controlling a furnace of the type described above in order to obtain for the steel ingots at the end of the heating an optimum ratio of the surface temperature to the center temperature. With consideration for the material properties of the ingots, the physical features of the furnace and the disturbances acting on the furnace, it will be possible to select for the transition of the ingot temperatures from the start to the end of the heating time in the furnace either a fixed drawing time for the ingots at optimum fuel consumption, or a floating drawing time for the ingots with an optimum heating period.

Another object of the present invention is to provide an arrangement of the foregoing character which is substantially simple in construction and may be economically fabricated.

A further object of the present invention is to provide a method for controlling a heating furnace for steel ingots, as described, which may be readily maintained in service and which has a substantially long operating life.

SUMMARY OF THE INVENTION

The objects of the present invention are achieved by measuring the surface temperature of the ingots and thermal data of the furnace over a period of time and by setting up heat balances. From the resulting furnace balance temperatures, together with the surface temperature of the blocks, an estimated value for the center temperature of the ingots is determined in an estimating device, the estimated ingot center and surface temperatures as actual temperatures are compared with predetermined ingot center and surface temperatures are nominal temperatures and the value resulting from the comparison is used for correcting the basic fuel quantity fed to the furnace. If a particularly accurate control of the furnace is desired, the surface temperature of each individual ingot in a furnace is measured. In an advantageous manner, the correction of the basic fuel quantity fed to the furnace starts after an empirically determined interval of ingot heating in the furnace, preferably after $\frac{1}{4}$ to $\frac{1}{3}$ of the required ingot soaking time in the furnace.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a graph showing the ingot temperatures plotted versus time.

BRIEF DESCRIPTION OF THE PREFERRED EMBODIMENTS

Figure 1:
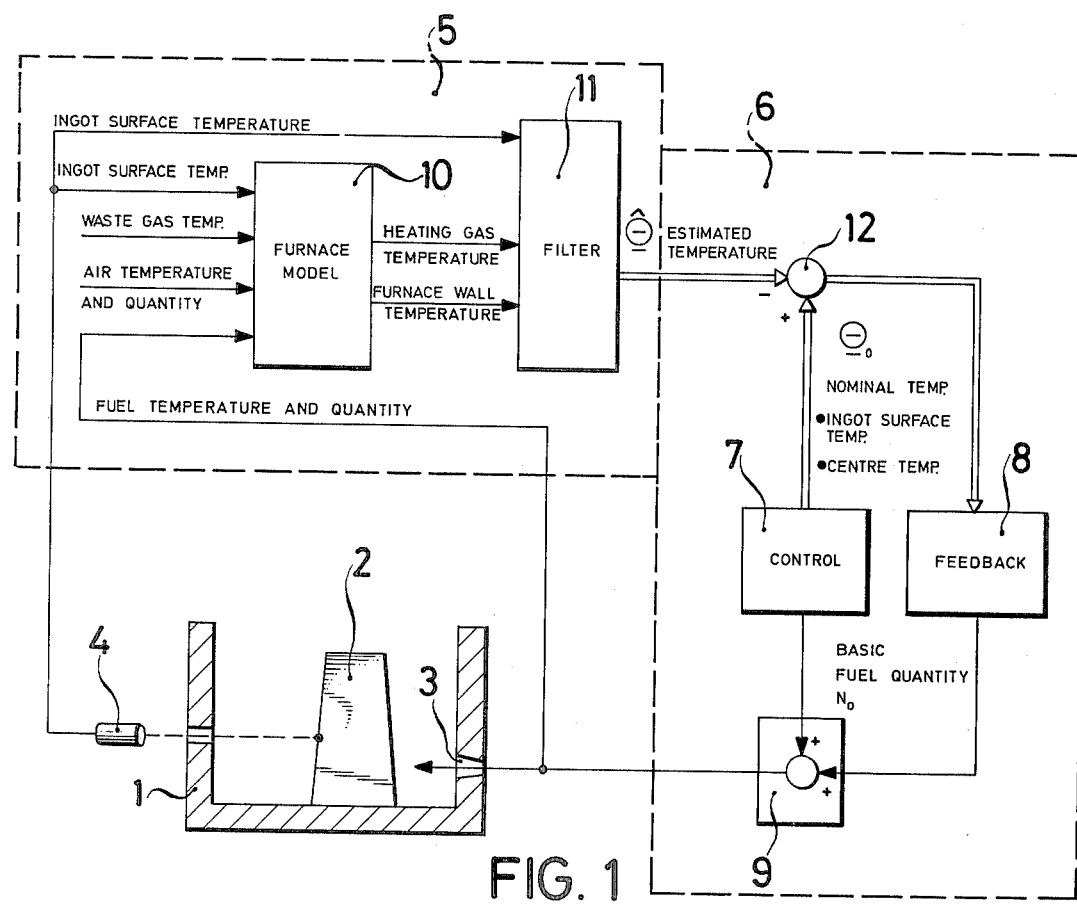
FIG. 1 shows a block diagram of the control of a soaking pit, in accordance with the present invention.

Referring to FIG. 1, steel ingots 2, of which only one is shown, are located in a soaking pit 1. Normally eight of these steel ingots 2 with an ingot cross-section of 0.5 m² each are in the soaking pit 1 which is closed on top with a cover (not shown). The soaking pits 1 are heated by burners 3 which are supplied by gas, for example. The surface temperature of the heated steel ingots 2 is measured by means of a temperature measuring instrument 4, preferably a radiation pyrometer, in time intervals of, for example, 3 minutes, with the curve denoted by $x_1$ in FIG. 2 representing the surface temperatures measured. For further processing, the following thermal data is measured at the same sampling time and recorded: the temperature of the air of combustion and its quantity, the temperature of the fuel and its quantity, the temperature of the waste gas of the soaking pit 1, and the temperature of the furnace chamber of the soaking pit. From these measured values, the heat balance is established for the soaking pit by the equation (1)

$$\dot{E}_B - \dot{E}_E = \dot{Q}_n + \dot{Q}_w \tag{1}$$

where $\dot{E}_B$ is the energy flow at the burner, $\dot{E}_E$ the energy flow at the furnace exit, $\dot{Q}_n$ the ingot heat flow and $\dot{Q}_w$ the wall heat flow.

The result of the heat balance computations performed continuously according to equation (1) yields the furnace balance temperature for the heating gas and the furnace wall. These values, together with the measured surface temperature of the ingots are fed into an estimating device 5 which continuously determines an estimated value for the center temperature and the surface temperature of the ingots. The estimated value for the surface temperature is formed because it is assumed that the measured surface temperature is affected with error. The estimated values for the center temperature, determined by the estimating device, are plotted on the diagram in FIG. 2 as $\hat{x}_5$ values. FIG. 2 indicates that after 30 tests, the error in the estimated center temperature is only 8° C.

In the further course of the method, the temperatures estimated for the center temperature and the surface temperature are considered as actual temperatures and fed into the control device 6 where they are compared with the nominal temperatures for the surface and the center of the ingots. The time-variable nominal values for the ingot surface temperature and the center temperature, $\theta_o(t)$, and the associated course of the basic fuel quantity $N_o(t)$ are provided by the control 7. The nominal temperature and the basic fuel quantity are determined according to predetermined optimizing criteria for a furnace operation mode optimum with respect to fuel or time.

The difference between the actual temperature and the nominal temperature is the temperature error of the ingots, for the surface and the core. This temperature error is fed to the feedback 8 with gain k.

An error amplified in the feedback 8 indicates the amount of correction of the basic fuel quantity to be suplied to the soaking pit 1 to eliminate the temperature error of the ingot. The output signal from the feedback device 8 actuates a correcting element 9 associated with the burner 3.

If the temperature error is positive, i.e., if the center and surface temperature of the ingot are too low, the correcting element 9 is opened further for a larger fuel quantity, or its opening is reduced for a negative temperature error. The feedback principle automatically compensates for unknown disturbances acting on the furnace process.

The correction of the basic fuel quantity supplied to the soaking pit 1 is started after about ¼ to ⅓ of the pit time required for heating the ingot in the furnace.

The advantage of the method according to the present invention is the provision of a method for controlling a soaking pit where steel ingots at the end of the heating period have an optimum ratio of the surface temperature to their center temperature. One may select either a fixed drawing time for ingots at optimum fuel consumption or a floating drawing time for the ingots with an optimum period.

Due to the availability of microcircuit technology at a price competitive with other hardware alternatives, it is now possible to consider implementing the estimating device 5 and the control device 6 on a microcomputer.

In applying the arrangement of FIG. 1, furthermore, the furnace model 10 may be in the form of a computer program. The program analyzes the heat exchange in the soaking pit as a problem of radiation heat transfer between the three bodies: (1) ingot surface, (2) pit wall and the (3) heating gas. The equations for heat transfer are obtained by making heat balances on the furnace system (equ. 1) and on the furnace wall. From these, a set of simultaneous nonlinear algebraic equations are obtained, involving the unknown average heating gas and furnace wall temperature in terms of the measured ingot surface temperature, fuel flow etc. The equations are solved by iteration. The computed average heating gas and furnace wall temperature is then applied, together with the measured ingot surface temperature, to the filter.

The filter 11 is a recursive estimation procedure which enables one to reconstruct the unmeasured center temperature of the observed ingot from the knowledge of the measured ingot surface temperature and the average heating gas and furnace wall temperature. The recursive estimator is especially convenient for use with small on-line computers since the filter operates on the measurements sequentially, requiring no large data storage. Each new set of measurements on the process is used to improve the estimate of the ingot center temperatures as the measurements become available periodically. Theory is used to find a filter algorithm which process the measurement data and provides an estimate of the state variable (ingot temperatures).

The filter, however, also requires the definition of a dynamic model describing the thermal behavior of the ingot during the soaking process. The definition of the appropriate mathematical model which describes the heat conduction within the ingots is a difficult problem. The model must be sufficiently complex to satisfy the estimation accuracy yet simple enough for microcomputers. The selection of fundamental state variables can lead to a simple formulation.

The filter output corresponding to the estimated ingot temperature is applied to a comparator 12 and a comparison step takes place, so as to compare the desired ingot temperature with the estimated ingot temperature. In case of a temperature error a difference signal is applied to the feedback element 8.

The feedback element 8 generates a signal used to drive the correcting element 9. The signal is generated by a linear control law which consists of constant coefficient feedback from all states. The feedback coefficients are determined from the solution of the matrix-Ricatti equation.

The correcting element 9 may be in the form of, for example, an adjustable orifice which is variably set to admit an adjusted amount of fuel quantity to the burner 3.

The control unit 7 provides the pre-computed normal optimal trajectory $\theta_o$ (desired ingot temperatures) and control $N_o$ (basic fuel quantity) and applies them to the correcting element 9, as well as the comparator 12. The control $N_o$ may be chosen in such a way so that the total system performance is maximized. The system performance in soaking pits is related to the profitability of the process. Energy cost (fuel quantity) and the temperature distribution throughout an ingot can be used as performance functionals.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method of controlling a heating furnace for steel ingots, particularly a soaking pit for steel ingots, comprising the steps of: charging the furnace with a basic fuel quantity for heating the ingots to rolling temperature by conducting fuel together with combustion air to the furnace; measuring ingot surface temperature and thermal data of the furnace; establishing heat balances; determining an estimated value for the ingot center temperature from furnace balance temperatures resulting from said step of establishing heat balances, together with said surface temperature; comparing said estimated ingot core temperature and said measured ingot surface temperature with predetermined wanted ingot center and ingot surface temperatures; and correcting said basic fuel quantity dependent on said comparing step.

2. A method as defined in claim 1 including the step of measuring surface temperature of each individual ingot in said furnace.

3. A method as defined in claim 1 including the step of starting correcting of said basic fuel quantity after an empirically determined time interval of ingot heating in said furnace.

4. A method as defined in claim 3 wherein said step of starting correction of said basic fuel quantity commences after ¼ and ⅓ of total required ingot heating time in said furnace.

* * * * *